3,253,804
PNEUMATIC TUBE STATIONS
Karl Hübner, Berlin-Britz, and Kurt Suhr, Berl-Neukolln, Germany, assignors to International Standard Electric Corporation, New York, N.Y., a corporation of Delaware
Filed May 21, 1963, Ser. No. 281,879
Claims priority, application Germany, June 1, 1962, St 19,324
4 Claims. (Cl. 243—19)

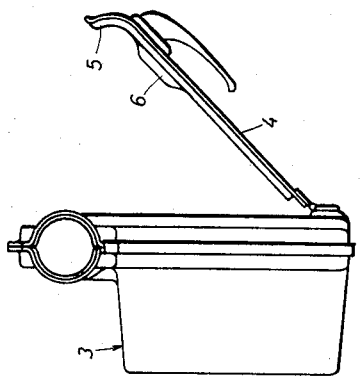
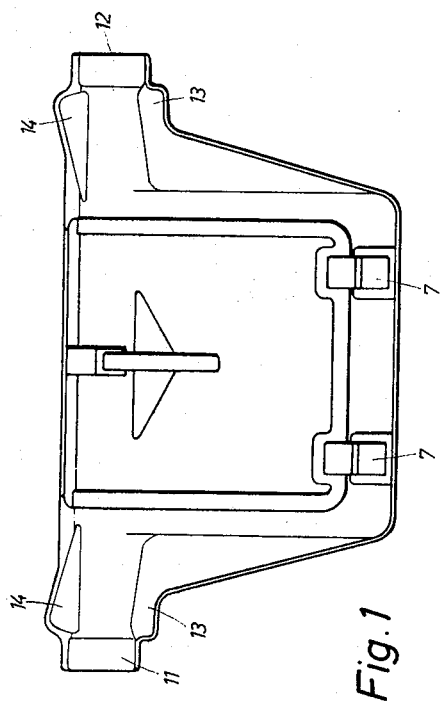
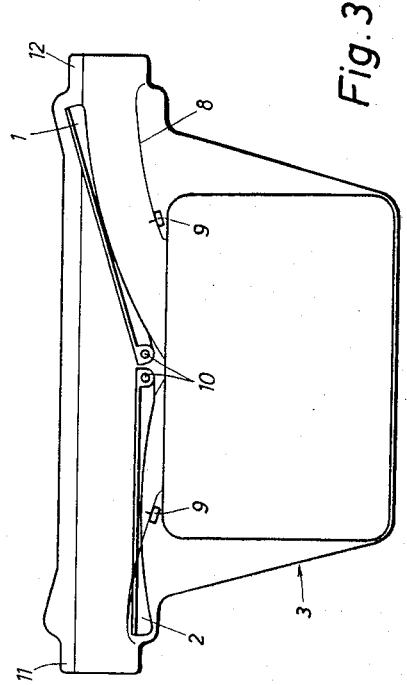

This invention relates to pneumatic tube stations, and more particularly to pneumatic tube stations for receiving and dispatching carriers in systems which can be operated in both directions.

Pneumatic tube systems which operate with carriers traveling alternately in both directions are known to the art. The stations in such systems must be capable of sending and receiving in both directions. To that end, an airtight housing is used, which is opened only to receive and to send the carriers.

There are various known methods for ejecting arriving carriers from the forwarding tube. The use of a switch is the most practical as it protects the carriers. In the case of known switches which eject carriers coming from both directions and are accommodated in a common housing, the support for the pivot axes and the arrangement of the switches take up so much space that the dimensions of the housings have to be made uneconomically large.

According to our invention, this drawback is removed by providing a switch comprising two tongues which can be worked independently of each other, arranged close together, and whose pivots are adjacent each other in a common housing.

The above-mentioned and other features and objects of this invention will become more apparent by reference to the following description taken in conjunction with the accompanying drawings, in which:

FIG. 1 is a side view of a pneumatic tube station in accordance with our invention;
FIG. 2 is an end view of the station of FIG. 1; and
FIG. 3 is a cross-sectional view of the station of FIG. 1.

Referring now to the drawings, it can be seen that housing 3 is in the shape of a trapezoid, with the longer of the parallel sides forming an extension of the forwarding tube into which the station is to be placed. The forwarding tube will be attached to bushings 11 and 12 provided for that purpose. Switch tongues 1 and 2 in the rest position are below the path of travel of the carriers to be conveyed and define a forwarding portion of the housing and are close to the housing's center line where they are arranged to swivel on pivots 10 provided for that purpose. In the vicinity of bushings 11 and 12 the housing has recesses 13 and 14 adjacent the forwarding portion of the housing, into which the free ends of switch tongues 1 and 2 fit, both in rest and working positions, respectively, so that a practically uninterrupted track can be established for carriers traveling by and for those being received. On the under side facing the path of travel, the tongues themselves are U-shaped or semi-cylindrical to form a track for departing carriers in the swung-out or working position.

The housing has rails 8 that, together with one of switch tongues 1 or 2 swung into the path of travel, form a track for the carrier being received into the receiving portion of the housing. There are many means known to the art for switching tongues 1 and 2 in response to received signals from carriers carrying encoded destinations. The housing itself can be sealed at the side by door 4, which opens wide enough either to permit removal of arriving carriers or insertion of departing carriers. To facilitate dispatching, portion 5 of door 4 is so shaped that the door forms part of the tube's wall as well as part of the track for carriers leaving the system. In particular, reinforcement 6 facing inward serves this purpose. The door swings on hinges 7. Travel contacts 9 on track 8 serve to indicate the arrival of a carrier.

While we have described the principles of our invention in connection with specific apparatus, it is to be clearly understood that this description is made only by way of example and not as a limitation to the scope of our invention as set forth in the accompanying claims.

We claim:
1. A station for sending, receiving, and passing carriers in a pneumatic tube system comprising: a housing formed with a pair of bushings for insulation of said housing between first and second portions of a forwarding tube of said pneumatic tube system to permit direct passage of a carrier from one portion of said forwarding tube through a forwarding portion of said housing into the other portion of said forwarding tube, said housing having a receiving portion and a door in its side for closing both the forwarding and receiving portions of said housing in a substantially air-tight fashion; and a pair of switch tongues mounted pivotally within said housing and extending in opposite directions toward the respective first and second portions of said forwarding tube, the respective pivotal axes of said switch tongues being positioned adjacent each other within said housing near a plane perpendicular to the direction of said forwarding tube and which bisects the structure of said housing, each of said switch tongues being capable of switching from a first position in which the movable end of said switch tongue lies within a recess formed in said housing adjacent the receiving portion thereof to a second position in which said movable end of said switch tongue lies within a recess formed in the interior wall of said forwarding portion of said housing on the side of said forwarding portion remote from said receiving portion of said housing, and said housing having first and second tracks therewithin for guiding a carrier between said tracks and respective ones of said switch tongues in said second position, for passage of a carrier between said forwarding tube and said receiving portion of said station housing when desired.

2. A station in accordance with claim 1 in which the surfaces of said respective switch tongues facing said receiving portion of said housing are concave in order to guide said carrier between said forwarding tube and said receiving portion of said station housing.

3. A station in accordance with claim 1, further including contacts in said guiding tracks for actuation by the passage of said carrier.

4. A station in accordance with claim 1 in which said switch tongues are made of plastic material.

References Cited by the Examiner

UNITED STATES PATENTS

| 307,437 | 11/1884 | Clay | 243—29 |
|---|---|---|---|
| 398,836 | 3/1889 | Lieb | 243—29 |
| 1,769,676 | 7/1930 | Cowley | 243—36 |
| 1,769,677 | 7/1930 | Cowley | 243—28 |
| 1,951,820 | 3/1934 | Emerson | 243—19 |
| 2,710,728 | 6/1955 | Halpern | 243—36 X |
| 3,104,078 | 9/1963 | Buchwald | 243—19 |

FOREIGN PATENTS 853,158   11/1960   Great Britain.

SAMUEL F. COLEMAN, Primary Examiner.
H. C. HORNSBY, Assistant Examiner.